(12) United States Patent
Raghu

(10) Patent No.: US 9,556,342 B2
(45) Date of Patent: Jan. 31, 2017

(54) ZWITTERIONIC LIGNIN DERIVATIVES

(71) Applicant: EMPIRE TECHNOLOGY DEVELOPMENT LLC, Wilmington, DE (US)

(72) Inventor: Sivaraman Raghu, Tamilnadu (IN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 76 days.

(21) Appl. No.: 14/549,895

(22) Filed: Nov. 21, 2014

(65) Prior Publication Data

US 2015/0135989 A1 May 21, 2015

(30) Foreign Application Priority Data

Nov. 21, 2013 (IN) .............................. 5368/CHE/2013

(51) Int. Cl.
*C09D 5/16* (2006.01)
*C08H 7/00* (2011.01)
*C09D 197/00* (2006.01)

(52) U.S. Cl.
CPC ............... *C09D 5/1637* (2013.01); *C08H 6/00* (2013.01); *C09D 197/005* (2013.01)

(58) Field of Classification Search
None
See application file for complete search history.

(56) References Cited

U.S. PATENT DOCUMENTS

| 5,989,299 A | 11/1999 | Dilling et al. |
| 2013/0236630 A1* | 9/2013 | Brizius ............... C09D 101/02 427/2.12 |

OTHER PUBLICATIONS

Banerjee et al., Antifouling Coatings: Recent Developments in the Design of Surfaces That Prevent Fouling by Proteins, Bacteria, and Marine Organisms, *Advanced Materials* (Feb. 8, 2011), 23(6):690-718.
Chen et al., Surface hydration: Principles and applications toward low-fouling/nonfouling Biomaterials, *Polymer* Aug. 18, 2010), 51(23):5283-5293.
Kuang et al., Universal Surface-Initiated Polymerization of Anti-fouling Zwitterionic Brushes Using a Mussel-Mimetic Peptide Initiator, *Langmuir* (May 8, 2012), 28(18):7258-7266.
Lignin, accessed at https://web.archive.org/web/20131115104757/http://en.wikipedia.org/wiki/Lignin, last modified on Nov. 4, 2013, pp. 1-7.
Liu et al., Amino Acid-Based Zwitterionic Poly (serine methacrylate) as an Antifouling Material, *Biomacromolecules* (Jan. 14, 2013), 14(1):226-231.
Waltersson, The metal binding properties of kraft lignin, Degree Project, ECTS 30.0, At Innventia, Stockholm, Sweden, pp. 1-27 (2009).
Zwitterionic Molecules for Ultra-Low Fouling, accessed at https://web.archive.org/web/20141024050550/http://nnin.com.s59343.gridserver.com/wp-content/uploads/2011/04/Zwitterioni-Flyer.pdf, accessed on Oct. 24, 2014, p. 1.

* cited by examiner

*Primary Examiner* — Robert A Wax
*Assistant Examiner* — Melissa Mercier
(74) *Attorney, Agent, or Firm* — Pepper Hamilton LLP

(57) ABSTRACT

Methods and compositions with anti-fouling properties that are derived from lignin are disclosed. The compositions include lignin with one or more zwitterionic functional groups. The lignin with one or more zwitterionic functional groups may be incorporated in paints and coatings to prepare biocidal coatings.

9 Claims, 1 Drawing Sheet

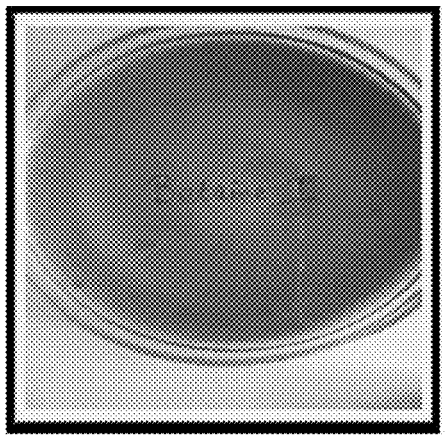
A
B
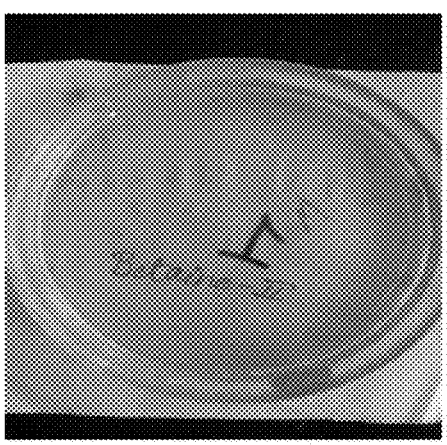
C
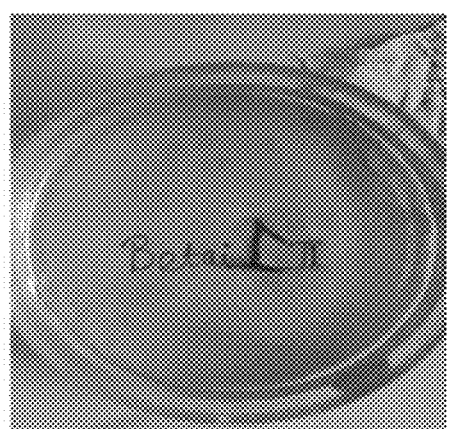
D
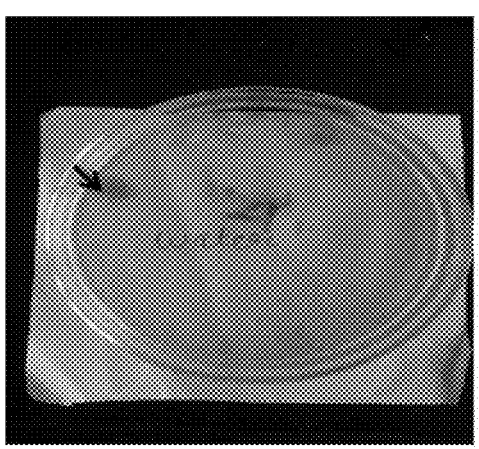
E
F

ZWITTERIONIC LIGNIN DERIVATIVES

CROSS-REFERENCE TO RELATED APPLICATION

This application claims priority benefit under Title 35 U.S.C. §119(a) of Indian Patent Application No. 5368/CHE/2013, filed Nov. 21, 2013, entitled, "Zwitterionic Lignin Derivatives" the contents of which are herein incorporated by reference.

BACKGROUND

Biofouling has significant impact on shipping industry. Biofouling on the hull of a vessel results in increased overall surface roughness, which leads to an increase in hydrodynamic drag. The associated costs include increased fuel consumption, labour costs of cleaning a vessels' hull, as well as removing and replacing damaged paint, in addition to costs associated with the downtime required for such services. Studies have found that biofouling may result in a 10% increase in a vessel's drag, which in turn results in a 40% increase in fuel consumption.

Existing antifouling solutions include tin and copper compounds added to a vessel's paint coating. These compounds are inadequate as they leach out of the cured paint coatings, resulting in limited prevention or reduction of biofouling. Further, these compounds may be harmful to aquatic life. Removal of biofouling material often requires mechanical efforts, as well as painting and refinishing. Such efforts require docking the vessel, and in some cases dry docking the vessel, resulting in costly downtime.

Zwitterionic materials have drawn the most attention due to their excellent biofouling properties, which are attributed to their strong hydration capacity due to the electrostatic interactions between zwitterions and water. Such zwitterions have been anchored on to polymers, such as polyacrylates, to develop surfactants, foaming agents, and demulsifying agents. However, the methods to make such zwitterionic materials are expensive and time consuming. Thus, simple and energy efficient methods to prepare zwitterionic compounds, especially from available biomaterials, are desired. Lignin-based zwitterionic compounds are an attractive alternative to these surfactants since lignins are abundantly available, inexpensive, and require simple chemistry.

SUMMARY

Disclosed herein are methods and compositions with anti-fouling properties that are derived from lignin. In one embodiment, a method of incorporating one or more zwitterionic functional groups into a lignin includes contacting the lignin with formaldehyde and an amino acid or an amino sulfonic acid in a solvent.

In another embodiment, a method of making a biocidal coating include contacting a lignin with formaldehyde and an amino acid or an amino sulfonic acid in a solvent to incorporate one or more zwitterionic functional groups into the lignin, and adding the lignin incorporated with one or more zwitterionic functional groups to a coating composition.

In an additional embodiment, a method of incorporating one or more zwitterionic functional groups into a lignin include contacting the lignin with epichlorohydrin in a solvent to form a reaction mixture, filtering the reaction mixture to obtain a filtrate, and contacting the filtrate with an amino acid or an amino sulfonic acid.

In a further embodiment, a method of making a biocidal coating include contacting the lignin with epichlorohydrin in a solvent to form a reaction mixture, contacting the reaction mixture with an amino acid or an amino sulfonic acid to incorporate one or more zwitterionic functional groups into the lignin, and adding the lignin incorporated with one or more zwitterionic functional groups to a coating composition to form the biocidal coating.

In another embodiment, a method of incorporating one or more zwitterionic functional groups into a lignin include contacting the lignin with an aldehyde and an amine or ammonia to form an amino lignin derivative, and contacting the amino lignin derivative with an acid.

In a further embodiment, a method of making a biocidal coating include contacting the lignin with an aldehyde and an amine or ammonia to form an amino lignin derivative, contacting the amino lignin derivative with an acid to incorporate one or more zwitterionic functional groups into the lignin, and adding the lignin incorporated with one or more zwitterionic functional groups to a coating composition to form the biocidal coating.

In an additional embodiment, a method of incorporating one or more zwitterionic functional groups into a lignin includes contacting a sulfonated lignin with an aldehyde and an amine or ammonia.

In yet another embodiment, a method of making a biocidal coating include contacting a sulfonated lignin with an aldehyde and an amine or ammonia to incorporate one or more zwitterionic functional groups into the lignin, and adding the lignin incorporated with one or more zwitterionic functional groups to a coating composition to form the biocidal coating.

In a further embodiment, a method of incorporating one or more zwitterionic functional groups into a lignin includes mixing a sulfonated lignin derivative and an amino lignin derivative.

In a further embodiment, a method of making a biocidal coating includes mixing a sulfonated lignin derivative and an amino lignin derivative to incorporate one or more zwitterionic functional groups into the lignin, and adding the lignin incorporated with one or more with zwitterionic functional groups to a coating composition to form the biocidal coating.

BRIEF DESCRIPTION OF THE FIGURE

FIG. 1 demonstrates the anti-fouling properties of lignin-based zwitterionic compounds according to an embodiment. A and B represent petri dishes exposed to betaine I, for 2 and 3 days, respectively. C and D represent petri dishes exposed to betaine II, for 2 and 3 days, respectively. E and F represent control petri dishes without the lignin compound, for 2 and 3 days, respectively. Arrows indicate the fungal growth.

DETAILED DESCRIPTION

Disclosed herein are methods and compositions with anti-fouling properties that are derived from lignin. More specifically, this disclosure relates to zwitterionic lignin-based additives and coatings.

Lignin, which represents 15-35% of wood, is the most abundant renewable organic material on the earth. The biofuel and paper industries produce large amounts of biomass waste products, such as lignin. Lignin is a highly cross-linked, heavily aromatic, polymeric product that has little value to these industries, and as such is treated as a waste material. Lignin represents an inexpensive material that is rich with functional groups made up of phenols and primary and secondary alcohols, which can be easily converted to zwitterionic functional groups. An exemplary generic lignin structure is given below:

amino sulfonic acids and formaldehyde to give zwitterionic products which will be stable both under acid and basic conditions. Alternatively, the phenolic groups can be reacted with epichlorohydrin to give lignin epoxides which can be

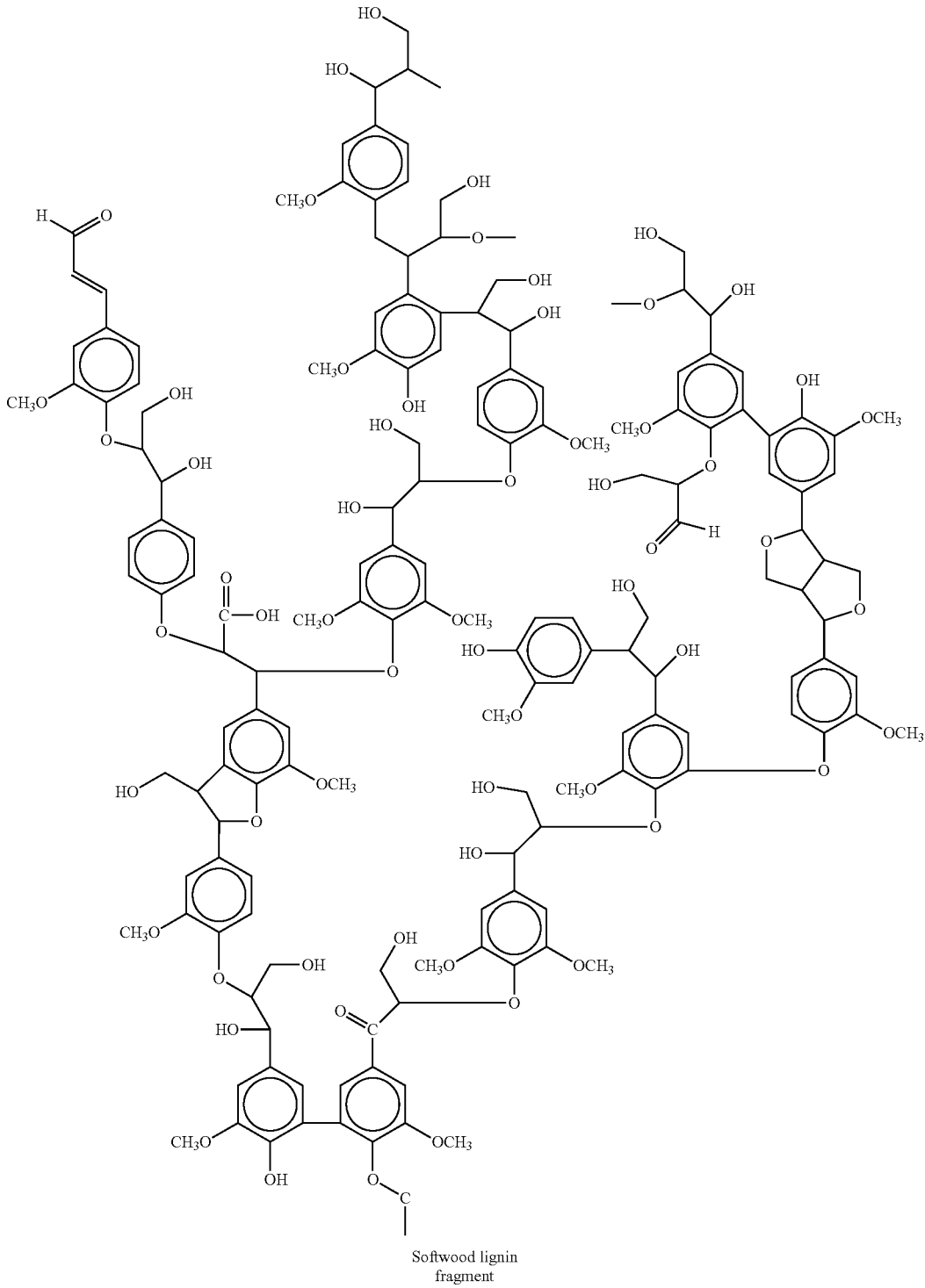

Softwood lignin fragment

Disclosed herein are methods and processes for incorporating one or more zwitterionic functional groups into a lignin. Since lignins have phenolic groups, these can either be made to undergo Mannich reactions with amino acids or amino sulfonic acids and formaldehyde to give zwitterionic reacted with amino acids or amino sulfonic acids to give stable zwitterionic products. The bonds generated by these simple reactions are chemically very stable. Further, due to the presence of a number of phenolic groups in lignin, a number of zwitterionic groups can be introduced into each lignin molecule. In addition, these hydrophilic functionalities in conjunction with the hydrophilic structure of lignins will latch on to metallic surfaces and will also be compatible with epoxies, acrylic, and polyurethane coatings.

In some embodiments, a method of incorporating one or more zwitterionic functional groups into a lignin includes contacting the lignin with formaldehyde and an amino acid or an amino sulfonic acid in a solvent. Non-limiting examples of amino acids that may be used are arginine, leucine, lysine, glycine, glutamic acid, aspartic acid, alanine, phenylalanine, serine, threonine, tyrosine, glutamine, histidine, valine, isoleucine, tryptophan, or a combination thereof.

In some embodiments, the amino sulfonic acids used may be, but are not limited to, aminomethane sulphonic acid, aminoethane sulphonic acid (taurine), aminohexane sulphonic acid, aminoisopropyl sulphonic acid, aminododecyl sulphonic acid, aminobenzene sulfonic acid, aminotoulene sulfonic acid, sulfanilic acid, chlorosulfanilic acid, diamino benzene sulfonic acid, amino phenol sulfonic acid, amino propyl benzene sulfonicacid, amino hexyl benzene sulfonic acid, or a combination thereof.

The mixture of lignin, formaldehyde and an amino acid or an amino sulfonic acid may be dissolved in a solvent, such as methanol, ethanol, dioxane, tetrahydrofuran, dimethylformamide, or a combination thereof.

In some embodiments, the contacting step includes refluxing the lignin with formaldehyde and an amino acid or an amino sulfonic acid for a period of time, such as about 15 minutes to about 2 hours, about 30 minutes to about 2 hours, about 45 minutes to about 2 hours, or about 1 hour to about 2 hours. Specific examples include about 15 minutes, about 30 minutes, about 1 hour, about 1.5 hours, about 2 hours, and ranges between any two of these values (including their endpoints). The refluxing may be performed at an elevated temperature, such as about 50° C. to about 80° C., about 60° C. to about 80° C., about 70° C. to about 80° C., or about 75° C. to about 80° C. Specific examples include about 50° C., about 55° C., about 60° C., about 75° C., about 80° C., and ranges between any two of these values (including their endpoints).

At the end of the reaction, the solvent may be removed by one or more methods, such as evaporation, extraction, distillation, or a combination thereof. The lignin with one or more zwitterionic functional groups obtained by the methods described herein may be an anti-fouling composition. An exemplary reaction is outlined below:

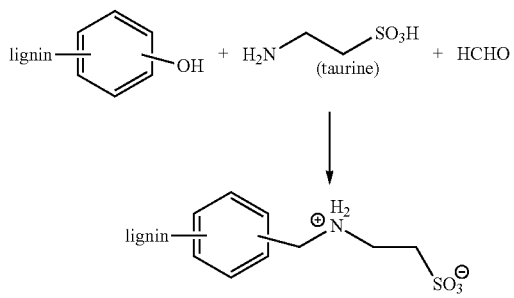

In some embodiments, a method of incorporating one or more zwitterionic functional groups into a lignin include contacting the lignin with epichlorohydrin in a solvent to form a reaction mixture, filtering the reaction mixture to obtain a filtrate, and contacting the filtrate with an amino acid or an amino sulfonic acid. Non-limiting examples of solvent that may be used are tetrahydrofuran, dioxane, methylene chloride, chloroform, pyridine, diethyl ether, benzene, toluene, methanol, ethanol, N,N-dimethylformamide, formamide, N,N-dimethylacetamide, acetonitrile, nitromethane, acetone, ethyl acetate, or any combination thereof.

The lignin and the epichlorohydrin dissolved in a solvent may be mixed at a temperature below room temperature, such as below or about 15° C., below or about 12° C., below or about 10° C., or below or about 5° C. Specific examples include about 2° C., about 5° C., about 8° C., about 10° C., or about 15° C. At the end of the reaction, the reaction mixture may be filtered and the filtrate may be contacted with the amino acid or the amino sulfonic acid.

In some embodiments, non-limiting examples of amino acids that may be used are arginine, leucine, lysine, glycine, glutamic acid, aspartic acid, alanine, phenylalanine, serine, threonine, tyrosine, glutamine, histidine, valine, isoleucine, tryptophan, or any combination thereof. In some embodiments, amino sulfonic acid may be aminomethane sulphonic acid, aminoethane sulphonic acid (taurine), aminohexane sulphonic acid, aminoisopropyl sulphonic acid, aminododecyl sulphonic acid, aminobenzene sulfonic acid, aminotoulene sulfonic acid, sulfanilic acid, chlorosulfanilic acid, diamino benzene sulfonic acid, amino phenol sulfonic acid, amino propyl benzene sulfonicacid, amino hexyl benzene sulfonic acid, or any combination thereof.

In some embodiments, the filtrate is heated with the amino acid or the amino sulfonic acid to an elevated temperature, such as about 60° C. to about 90° C., about 70° C. to about 90° C., about 80° C. to about 90° C., or about 85° C. to about 90° C. Specific examples include about 60° C., about 70° C., about 80° C., about 90° C., and ranges between any two of these values (including their endpoints). The heating may be performed for a period of time, such as about 10 minutes to about 2 hours, about 30 minutes to about 2 hours, about 45 minutes to about 2 hours, or about 1 hour to about 2 hours. Specific examples include about 10 minutes, about 30 minutes, about 1 hour, about 1.5 hours, about 2 hours, and ranges between any two of these values (including their endpoints).

At the end of the reaction, the solvent may be removed by one or more methods, such as evaporation, extraction, distillation, or a combination thereof. The lignin with one or more zwitterionic functional groups obtained by the methods described herein may be an anti-fouling composition. An exemplary reaction is outlined below:

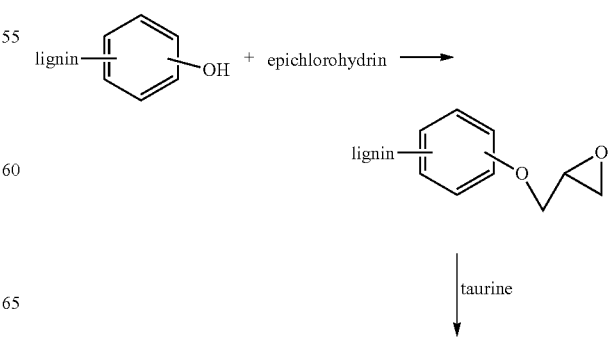

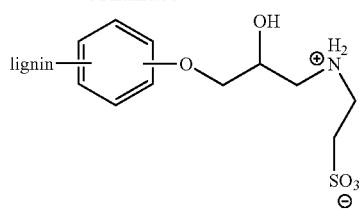

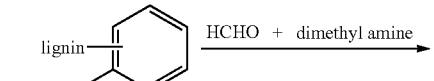

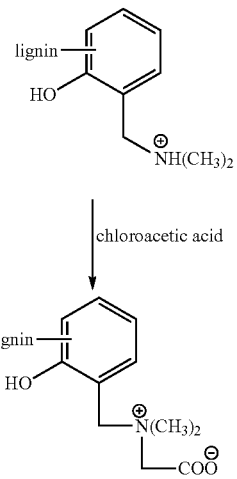

In some embodiments, a method of incorporating one or more zwitterionic functional groups into a lignin include contacting the lignin with an aldehyde and an amine or ammonia to form an amino lignin derivative, and contacting the amino lignin derivative with an acid. Non-limiting examples of aldehyde that may be used are formaldehyde, benzaldehyde, acetaldehyde, propionaldehyde, butyraldehyde, glyoxal, glyoxylic acid, chloroacetaldehyde, chlorobenzaldehyde, tolualdehyde, alkyl benzaldehyde, or any combination thereof. In some embodiments, the amine may be a primary amine, a secondary amine, or any combination thereof. Examples of amine include methylamine, dimethylamine, propyl amine, ethanolamine, diphenylamine, diethylamine, dipropylamine, benzylamine, octylamine, amino propanol, or a combination thereof.

The reaction between the lignin, aldehyde and the amine or ammonia may be a Mannich reaction and performed in the presence of a catalyst. Suitable catalysts that may be used are ZnO, MgO, a metal-phosphine complex, an acid catalyst, a base catalyst, or any combination thereof. The reaction may be performed at an elevated temperature, such as about 20° C. to about 40° C., about 20° C. to about 40° C., or about 20° C. to about 40° C. Specific examples include about 20° C., about 25° C., about 30° C., about 40° C., and ranges between any two of these values (including their endpoints). The reaction period may vary, such as about 2 hours to about 12 hours, about 4 hours to about 12 hours, about 6 hours to about 12 hours, or about 8 hours to about 12 hours. Specific examples include about 2 hours, about 3.5 hours, about 6 hours, about 8 hours, about 12 hours, and ranges between any two of these values (including their endpoints).

In some embodiments, the amino lignin derivative is reacted with an acid, such as chloroacetic acid, bromoacetic acid, trichloroacetic acid, dichloroacetic acid, tribromoacetic acid, dibromoacetic acid, bromo propionic acid, acrylic acid, methacrylic acid, or any combination thereof. The amino lignin derivative and the acid may be reacted at an elevated temperature, such as about 50° C. to about 100° C., about 60° C. to about 100° C., or about 80° C. to about 100° C. Specific examples include about 50° C., about 75° C., about 80° C., about 100° C., and ranges between any two of these values (including their endpoints). The reaction may be performed for various periods of time, such as about 30 minutes to about 6 hours, about 1 hour to about 6 hours, about 2 hours to about 6 hours, or about 4 hours to about 2 hours. Specific examples include about 30 minutes, about 1 hour, about 1.5 hours, about 2 hours, about 4 hours, about 6 hours, and ranges between any two of these values (including their endpoints). The lignin with one or more zwitterionic functional groups obtained by the methods described herein may be an anti-fouling composition. An exemplary reaction is outlined below:

In some embodiments, a method of incorporating one or more zwitterionic functional groups into a lignin include contacting a sulfonated lignin with an aldehyde and an amine or ammonia. Sulfonated lignins may be obtained from any source, such as a waste by-product from pulping industry or any other commercial source. Non-limiting examples of aldehyde that may be used are formaldehyde, benzaldehyde, acetaldehyde, propionaldehyde, butyraldehyde, glyoxal, glyoxylic acid, chloroacetaldehyde, chlorobenzaldehyde, tolualdehyde, alkyl benzaldehyde, or any combination thereof. In some embodiments, the amine may be a primary amine, a secondary amine, or any combination thereof. Examples of amine include methylamine, dimethylamine, propyl amine, ethanolamine, diphenylamine, diethylamine, dipropylamine, benzylamine, octylamine, amino propanol, or a combination thereof. The reaction between the sulfonated lignin, aldehyde and the amine or ammonia may be a Mannich reaction and performed in the presence of a catalyst. Suitable catalysts that may be used are ZnO, MgO, a metal-phosphine complex, an acid catalyst, a base catalyst, or any combination thereof. The reaction may be performed at an elevated temperature, such as about 20° C. to about 40° C., about 20° C. to about 40° C., or about 20° C. to about 40° C. Specific examples include about 20° C., about 25° C., about 30° C., about 40° C., and ranges between any two of these values (including their endpoints). The reaction period may vary, such as about 2 hours to about 12 hours, about 4 hours to about 12 hours, about 6 hours to about 12 hours, or about 8 hours to about 12 hours. Specific examples include about 2 hours, about 3.5 hours, about 6 hours, about 8 hours, about 12 hours, and ranges between any two of these values (including their endpoints). The lignin with one or more zwitterionic functional groups obtained by the methods described herein may be an anti-fouling composition. An exemplary reaction is outlined below:

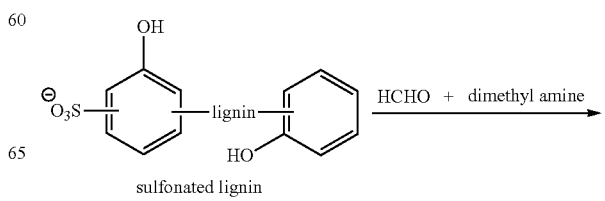

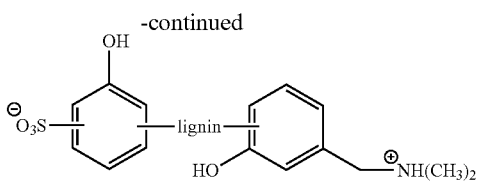

In some embodiments, a method of incorporating one or more zwitterionic functional groups into a lignin include mixing a sulfonated lignin derivative and an amino lignin derivative. The sulfonated lignin derivative may be obtained from any commercial source or from pulp industry. The amino lignin derivative may be prepared by the methods described herein. In some embodiments, the sulfonated lignin derivative and the amino lignin derivative may be mixed in various weight ratios, such as about 1:1 to about 1:10, about 1:1 to about 1:8, about 1:1 to about 1:6, or about 1:1 to about 1:4. Specific examples include about 1:1, about 1:3, about 1:5, about 1:9, about 1:10, and ranges between any two of these values (including their endpoints).

In some embodiments, the lignin with one or more zwitterionic functional groups prepared by the methods I-V described herein may be used to prepare biocidal coatings. The lignin with one or more zwitterionic functional groups may be added as additives to a coating composition. The zwitterionic lignin derivatives may be present in the coating composition at various concentrations, such as about 0.5 to about 20 weight percent, at about 0.5 to about 15 weight percent, at about 0.5 to about 10 weight percent, at about 0.5 to about 5 weight percent, or at about 0.5 to about 1 weight percent. Specific examples include about 0.5 weight percent, about 1 weight percent, about 15 weight percent, about 12 weight percent, about 15 weight percent, about 20 weight percent of the total weight, and ranges between (and including the endpoints of) any two of these values. In some embodiments, the lignin with one or more zwitterionic functional groups may be incorporated in the paint composition at the end of the process, and mixed with the paint before use. For example, an end consumer may add the zwitterionic lignin derivatives to any conventional paint formulation before use.

The biocidal coatings prepared from the lignin with one or more zwitterionic functional groups may further include a binder, a solvent, a pigment, a coalescing agent, a rheology modifier, a plasticizer, a surfactant, or any combination thereof. Non-limiting examples of the binder may be an acrylate, styrenic or a vinyl polymer. Suitable binder polymers may be polymers of alkylacrylate, alkyl methacrylate, allyl methacrylate, acrylic acid, methacrylic acid, acrylamide, 2-hydroxyethyl methacrylate, 2-hydroxypropyl methacrylate, thioethyl methacrylate, vinyl methacrylate, vinyl benzene, 2-hydroxyethyl acrylate, butyl acrylate, 2-ethylhexyl acrylate, vinyltrimethoxysilane, vinyltriethoxysilane, vinyl formate, vinyl acetate, vinyl propionate, vinyl butyrate, vinyl hexanoate, vinyltoluene, α-methyl styrene, chlorostyrene, or styrenesulfonic acid, or a copolymer of any of the foregoing, or any combination thereof. In some embodiments, the lignin with zwitterionic functional groups may be dispersed in paints having inorganic binders. Inorganic binders may include, without limitation, alkali metal polysilicates, such as potassium polysilicate, sodium polysilicate, lithium polysilicate or the like.

Biocidal paints and coatings may contain one or more additives or components in their composition. These additives alter and improve properties of the paint, such as shelf life, application and longevity, health and safety. Such additives may be added, for example, during the manufacture of the emulsion polymer or during the formulation of the paint itself. Additives include initiators, rheology modifiers, preservatives, coalescing agents, and the like. Initiators are a source of free radicals to initiate the polymerization process in which monomers polymerize to form the polymers. Coatings may contain a redox system initiator that promotes polymerization at room temperature, such as ferrous salts, thiosulfate salts, or persulfate salts.

Thickeners and rheology modifiers may also be added to coatings to achieve the desired viscosity and flow properties. Thickeners function by forming multiple hydrogen bonds with the acrylic polymers, thereby causing chain entanglement, looping and/or swelling which results in volume restriction. Thickeners, such as cellulose derivatives including hydroxyethyl cellulose, methyl cellulose and carboxymethyl cellulose, may be used in the compositions.

One or more preservatives may be added in the coating compositions in low doses to protect against the growth of micro-organisms. Preservatives, such as methyl benzisothiazolinones, chloromethylisothiazolinones, barium metaborate and 1-(3-chloroallyl)-3,5,7-triaza-1-azoniaadamantane chloride, may be used.

Coalescing agents, such as ester alcohols, benzoate ethers, glycol ethers, glycol ether esters and n-methyl-2-pyrrolidone, may be added to the coating compositions. Coalescing agents are sometimes added to promote film formation under varying atmospheric conditions. Coalescing agents may be slow evaporating solvents with some solubility in the polymer phase. Coalescing agents may also act as a temporary plasticizer, allowing film formation at temperatures below the system's glass transition temperature. After film formation, the coalescing agents may slowly diffuse to the surface and evaporate, thereby increasing the hardness and block resistance of the film.

Coatings may further contain one or more of the following components or additives: solvents, pigments, plasticizers, and the like. One or more plasticizers may be added to the compositions to adjust the tensile properties of the paint film. Plasticizers may be, for example, a glucose-based derivative, a glycerine-based derivative, propylene glycol, ethylene glycol, phthalates and the like.

The paints according to the disclosure may further include hydrophilic agents attached to one or more pigments. The term "pigments" is intended to embrace, without limitation, pigmentary compounds employed as colorants, including white pigments, as well as ingredients commonly known in the art as "opacifying agents" and "fillers". Pigments may be any particulate organic or inorganic compound and may provide coatings with the ability to obscure a background of contrasting color (hiding power).

The coatings may be used as a decorative coating, an industrial coating, a protective coating, a UV-protective coating, a self-cleaning coating, a biocidal coating, or any combination thereof. The coatings may generally be applied to any substrate. The substrate may be an article, an object, a vehicle or a structure. Although no particular limitation is imposed on the substrate to be used in the present disclosure, exemplary substrates include an exterior of a building, vehicles, cars, trucks, bicycles, bridges, airplanes, helicopters, metal railings, fences, glasses, plastics, metals, ceramics, wood, stones, cement, fabric, paper, leather, walls, pipes, ships and vessels, boats, medical devices, surfaces of automotive parts and body panels, parts and body panels of amphibious vehicles, aircraft parts and body panels, turbines, fans, air conditioners, refrigeration units and parts, humidifiers, dehumidifiers, cooling towers, water storage tanks and containers, tankers, hoses and fittings, vent and ductwork, pipes and tubes, plumbing parts and tools, swimming pools, and the like. The coating may be applied to a substrate by spraying, dipping, rolling, brushing, or any combination thereof.

The anti-fouling lignin compounds with zwitterionic functional groups described herein may also be applied as a powder or a solution to control the growth of microbes on wood, plastics, biofuels, garbage cans, and adsorbents. The anti-fouling compounds described herein may also be used in water treatment plants, swimming pools, aquariums, toilets, hospitals, food processing industries, restaurants, waste management industries and the like.

In some embodiments, the lignin compounds with zwitterionic functional groups may also be mixed with epoxy resins. Exemplary resins in which the lignin compounds may be incorporated include, but are not limited to, polyurethanes, silicones, commercial epoxy resins, urea-formaldehyde resins, melamine-formaldehyde resins, hydroxymethyl urea-formaldehyde resins, hydroxymethyl melamine-formaldehyde resins and the like. Epoxy resins containing lignin compounds of the present disclosure may be used with, for example, acrylic systems to provide excellent coatings for articles of manufacture, such as appliances, kitchen cabinets, outdoor furniture, aluminum siding, metal products, washing machines, appliances, ships, bridges, pipelines, chemical plants, automobiles, farm implements, containers, floor surfaces, and the like.

EXAMPLES

Example 1

Preparation of a Lignin with Zwitterionic Functional Groups (Betaine I)

About 20 grams of lignin dissolved in 100 mL of methanol was mixed with 1.5 grams of para-formaldehyde. To this mixture, about 7 grams of glycine was added and the resulting mixture was refluxed for 30 minutes at 65° C. The solvent was evaporated and the residue was collected to obtain a lignin with zwitterionic functional groups.

Example 2

Preparation of a Lignin with Zwitterionic Functional Groups (Betaine II)

About 10 grams of lignin dissolved in 100 mL of tetrahydrofuran was mixed with 2 grams of solid potassium carbonate. A solution mixture of 2.5 mL of epichlorohydrin and 10 mL of tetrahydrofuran was added, and the temperature was maintained below 10° C. The solution was filtered and to the filtrate about 3.5 grams glycine was added. The mixture was heated to 80° C. for 15 minutes. The solvent was removed under reduced pressure to obtain a solid residue of lignin with zwitterionic functional groups.

Example 3

Preparation of a Lignin with Zwitterionic Functional Groups

About 10 grams of lignin is mixed with 20 mL of formaldehyde (37 weight percent) and 20 mL of dimethylamine in the presence of ZnO. The reaction is allowed to occur for 6 hours at room temperature. About 5 grams chloroacetic acid is added and the mixture is heated to 80° C. for 15 minutes. At the end of the reaction, the solvent is removed under reduced pressure to obtain a solid residue of lignin with zwitterionic functional groups.

Example 4

Anti-Fouling Properties

The biocidal lignin compounds betaine I and II were spread on different petri dishes containing a mixture of tap water and 20% (weight percent) sugar solution, and placed in sunlight for observation. A petri dish with water and sugar solution but without the lignin compound was used as control. The control petri dish without lignin compound showed fungal growth on the sugared water, whereas the petri dishes containing lignin compounds were free of such fungal growths, as shown in FIG. 1.

Example 5

Application of Anti-Fouling Coating to a Wooden Surface

A coating with a biocidal lignin compound of Example 1 is coated on a wooden surface. A similar wooden surface is coated with a paint without the lignin compound. After drying the paint, the surfaces are exposed to running water for one month. At the end of the period, the wooden surfaces are checked for visible peeling of the paint and growth of organisms such as algae. The wooden surface coated with the paint containing the biocidal lignin compound will be free of algae, while the other surface will exhibit the growth of algae.

Example 6

Application of Anti-Fouling Paint to a Marine Vessel

A zwitterionic lignin compound of Example 2 is mixed with a marine grade paint and applied to the hull of a marine vessel, according to the manufacturer's instructions. The paint is then allowed to dry. Once dry, the zwitterionic lignin compound will be permanently present in the dried paint and provide biocidal and antifouling properties to the paint coating.

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A method of making a biocidal coating, the method comprising:
   contacting a lignin with a formaldehyde and an amino acid or an amino sulfonic acid in a solvent to incorporate one or more zwitterionic functional groups into the lignin; and adding the lignin incorporated with the one or more zwitterionic functional groups to a coating composition.

2. The method of claim 1, wherein adding the lignin incorporated with the one or more zwitterionic functional groups to the coating composition comprises adding the lignin incorporated with the one or more zwitterionic functional groups to the coating composition comprising a binder, a solvent, a pigment, a coalescing agent, a rheology modifier, a plasticizer, a surfactant, or any combination thereof.

3. The method of claim 1, wherein contacting the lignin with the formaldehyde and the amino acid comprises contacting the lignin with the formaldehyde and the amino acid selected from arginine, leucine, lysine, glycine, glutamic acid, aspartic acid, alanine, phenylalanine, serine, threonine, tyrosine, glutamine, histidine, valine, isoleucine, tryptophan, and a combination thereof.

4. The method of claim 1, wherein contacting the lignin with the formaldehyde and the amino sulfonic acid comprises contacting the lignin with the formaldehyde and the amino sulfonic acid selected from aminomethane sulphonic acid, aminoethane sulphonic acid (taurine), aminohexane sulphonic acid, aminoisopropyl sulphonic acid, aminododecyl sulphonic acid, aminobenzene sulfonic acid, aminotoulene sulfonic acid, sulfanilic acid, chlorosulfanilic acid, diamino benzene sulfonic acid, amino phenol sulfonic acid, amino propyl benzene sulfonicacid, amino hexyl benzene sulfonic acid, and a combination thereof.

5. The method of claim 1, wherein the contacting the lignin with the formaldehyde and an amino acid or an amino sulfonic acid comprises refluxing the lignin with the formaldehyde and the amino acid or the amino sulfonic acid for about 15 minutes to about 2 hours at a temperature of about 50° C. to about 80° C.

6. The method of claim 1, wherein contacting the lignin with the formaldehyde and the amino acid or the amino sulfonic acid comprises refluxing the lignin with the formaldehyde and the amino acid or the amino sulfonic acid for about 30 minutes at about 65° C.

7. The method of claim 1, wherein contacting the lignin with the formaldehyde and the amino acid or the amino sulfonic acid in the solvent comprises contacting in the presence of the solvent selected from methanol, ethanol, dioxane, tetrahydrofuran, dimethylformamide, and a combination thereof.

8. The method of claim 1, further comprising removing the solvent after the contacting step.

9. The method of claim 1, wherein adding the lignin incorporated with the one or more zwitterionic functional groups to the coating composition comprises adding zwitterionic lignin derivatives to a concentration of about 0.5 to about 20 weight percent of the coating composition.

* * * * *

UNITED STATES PATENT AND TRADEMARK OFFICE
CERTIFICATE OF CORRECTION

PATENT NO. : 9,556,342 B2  
APPLICATION NO. : 14/549895  
DATED : January 31, 2017  
INVENTOR(S) : Raghu Page 1 of 1

It is certified that error appears in the above-identified patent and that said Letters Patent is hereby corrected as shown below:

In the Specification

In Column 1, Line 7, delete "§119(a)" and insert -- § 119(a) --, therefor.

In Column 1, Line 8, delete "filed Nov. 21, 2013," and insert -- filed on Nov. 21, 2013, --, therefor.

In the Claims

In Column 16, Line 4, in Claim 5, delete "an amino acid or an amino" and insert -- the amino acid or the amino --, therefor.

Signed and Sealed this  
Twenty-fifth Day of April, 2017

Michelle K. Lee  
*Director of the United States Patent and Trademark Office*